Figure 1:
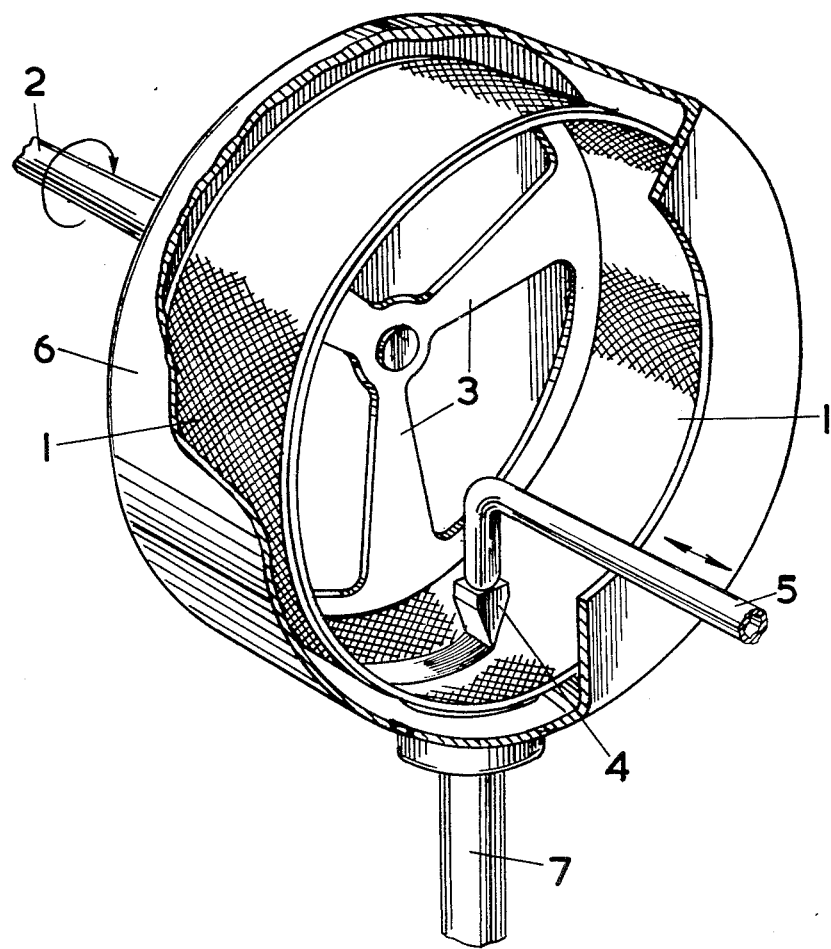

United States Patent [19]

Bagg et al.

[11] 4,016,031
[45] Apr. 5, 1977

[54] MANUFACTURE OF COMPOSITE MATERIALS

[75] Inventors: Greville Euan Gordon Bagg, Waltham Abbey; John Cook, Cheshunt; Leslie Ernest Dingle, London; Henry Edwards, Harlow; Hans Ziebland, Hertford, all of England

[73] Assignee: National Research Development Corporation, London, England

[22] Filed: Jan. 6, 1975

[21] Appl. No.: 538,708

Related U.S. Application Data

[63] Continuation-in-part of Ser. No. 283,665, Aug. 25, 1972, abandoned.

[30] Foreign Application Priority Data

Sept. 1, 1971  United Kingdom .............. 40699/71

[52] U.S. Cl. .............................. 162/213; 162/218; 162/384; 264/311; 425/85
[51] Int. Cl.² ........................................ D21F 11/06
[58] Field of Search .......... 162/213, 384, 218, 102, 162/116; 425/85, 86; 264/311

[56] References Cited

UNITED STATES PATENTS

| | | | |
|---|---|---|---|
| 3,210,241 | 10/1965 | Grauss et al. | 162/384 |
| 3,773,447 | 11/1973 | Barratt | 425/86 |
| 3,778,206 | 12/1973 | Barratt | 425/86 |
| 3,892,623 | 7/1975 | Barratt | 162/120 |

*Primary Examiner*—Robert L. Lindsay, Jr.
*Assistant Examiner*—George C. Yeung
*Attorney, Agent, or Firm*—Cushman, Darby & Cushman

[57] ABSTRACT

Mats of aligned fibers are formed by feeding a dispersion of fibers through an aligning nozzle onto the inner surface of a cylindrical permeable surface and rotating the surface sufficiently rapidly to remove the dispersion medium and maintain the fiber alignment on the surface.

15 Claims, 4 Drawing Figures

MANUFACTURE OF COMPOSITE MATERIALS

This application is a Continuation-in-Part of application Ser. No. 283,665 filed 25 Aug. 1972, now abandoned.

The invention relates to improvements in the manufacture of composite materials comprising a matrix containing reinforcing fibres and is particularly concerned with the production of webs, strands and the like, consisting of substantially uniaxially aligned fibres suitable for incorporation into, or infiltration by, a matrix material to give composite materials containing up to about 70% by volume of fibre.

U.S. Pat. No. 3,617,437 describes how fibre alignment is essential for efficient packing of reinforcing fibres into a matrix in proportions sufficient to confer a useful degree of reinforcement upon the resulting composite; and describes how such fibre alignment may be achieved by extruding a dispersion of reinforcing fibres through an orifice and maintaining the resulting alignment by depositing the extruded dispersion upon a permeable surface subject to suction so that the dispersion medium is removed sufficiently quickly to prevent the deposited fibres from flowing from their aligned relationship. These processes have been extremely successful in producing aligned assemblies of a wide variety of reinforcing fibres but have been found subject to some disadvantages when employed to build up aligned fibre felts of considerable thicknesses upon the permeable surface. The main disadvantage is that thicknesses of aligned fibres tend to increase the filtration resistance and reduce the suction acting upon freshly deposited layers of aligned fibre suspension, thus failing to remove the dispersion liquid sufficiently quickly to prevent serious misalignment of the fibres, thereby reducing the fibre packing density and mechanical properties of the resulting composite. Also it has proved difficult to achieve the high degree of alignment necessary to produce composites of greater than 45% (v/v) fibre content at the low pressures commonly used in autoclave moulding (about 0.4 MN m$^{-2}$). This restricts the use of felts to high pressure moulding processes which are expensive and limit component size.

The present invention aims to provide an alternative procedure for the removal of dispersion media from dispersions of aligned fibres whilst maintaining their alignment and may be of particular value in forming relatively thick felts of fibre whilst retaining good fibre alignment (generally with at least 50% of the fibres within ten degrees of a desired alignment direction, although with carbon fibres very much better alignment with at least 90% within 10° may be expected). In addition the process of the present invention is capable of producing a higher degree of alignment than processes described hitherto, thus permitting the production of fibre composites having higher fibre content or similar fibre content at lower moulding pressures.

According to the present invention, a process for the manufacture of composite materials comprising a matrix containing aligned reinforcing fibres includes the steps of dispersing the fibres in a liquid dispersion medium, passing the dispersion through an aligning nozzle so that the fibres are at least partially aligned and depositing the dispersion containing the aligned fibres upon a permeable surface capable of retaining substantially all the fibres and moving relative to the nozzle at a speed greater than the speed with which the fibres are travelling immediately before deposition and with an angular velocity sufficient to pass the dispersion medium rapidly through the permeable surface by a centrifual acceleration and thereby maintain the alignment of the aligned fibres upon the permeable surface such that at least 50% of the fibres are within 10° of the desired alignment direction.

Essentially, therefore, it will be appreciated that processes in accordance with the present invention replace a permeable surface under suction as described in U.S. Pat. 3,617,437 by a permeable surface through which is created a centrifugal acceleration which may be substantially greater than the suction force applied in U.S. Pat. No. 3,617,437.

In order to achieve an appropriate value of centrifugal acceleration for the permeable surface, the surface is preferably constructed in the form of an endless belt of permeable material and most conveniently as a cylinder rotating about a generally horizontal axis. The dispersion containing aligned fibres is supplied to an inside surface of the closed loop from an aligning nozzle at a rate dependent, inter alia, upon the velocity of the permeable surface.

Accordingly, apparatus for carrying out a process in accordance with the present invention comprises an aligning nozzle capable of supplying a dispersion containing aligned fibres in a liquid dispersion medium and a permeable surface in the form of an endless belt of permeable material disposed to receive the dispersion from the aligning nozzle, the permeable surface being constructed to retain substantially all the fibres received from the aligning nozzle and being moveable with an angular velocity sufficient to cause the dispersion medium to pass rapidly through the permeable surface by centrifugal acceleration thereby maintaining alignment of the aligned fibres retained on the permeable surface.

The permeable surface may be composed of any porous material which permits passage of the liquid dispersion medium and retains the aligned fibres. However, in practice, the permeable surface generally will be composed of a screen of wire mesh or perforated metal sheet with apertures small enough to retain the fibres and large enough to permit rapid passage of dispersion medium; such a surface being readily constructed in form strong enough to withstand the centrifugal acceleration stresses imposed during the operation of the apparatus. The permeable surface may be covered with a flexible permeable liner to assist removal of completed fibre felts.

The aligning nozzle may be any type of forming channel, extrusion orifice, or the like which is capable of aligning a proportion, preferably the major proportion, of fibres in a dispersion passed through the nozzle. However tapered nozzles terminating in a circular orifice normally produce superior alignment to slit nozzles. Such circular orificies may be used in the present apparatus without the penalty of seriously reduced output which makes them undesirable in slower processes such as described in U.S. Pat. No. 3,617,437.

The angular velocity of the permeable surface required to achieve removal of dispersion medium from the deposited fibres sufficiently rapidly to maintain their alignment is a function of the thickness of the layer of aligned fibres on the permeable surface; the drainage rate of the permeable surface and the aligned fibres thereon; and the viscosity of the dispersion medium. The most appropriate angular velocity will therefore vary with the particular fibre dispersion used and is best determined by a few trail runs with the selected fibre dispersion. In general, however, for optimum alignment the centrifugal acceleration should be at least 150 times the acceleration due to gravity (g). Very high accelerations above about 500g should, however, be avoided since they may produce a very dry fibre mat liable to disruption by air turbulence, especially in small apparatus where the linear velocity of the permeable surface is high.

In accordance with an important optional feature of processes in accordance with the invention, the angular velocity of the permeable surface is increased as the thickness of aligned fibres retained by the permeable surface increases so that the rate of removal of dispersion medium from the fibres remains at a rate sufficient to prevent serious misalignment of newly deposited aligned fibres.

Whatever the selected angular velocity, the speed of the permeable surface at the position upon which the dispersion of aligned fibres is deposited should exceed, and preferably be at least twice, the speed with which the fibres are travelling immediately before deposition. In this way a further aligning force is exerted upon the fibres as they contact the permeable surface.

A felt of aligned fibres in which all the fibres are substantially parallel may be readily formed by processes in accordance with the invention in which the permeable surface is continuously moved with appropriate angular velocity past a stationary aligning nozzle delivering fibre dispersion containing aligned fibres. However, when using a circular orifice or narrow slit with a cylindrical permeable surface, it is desirable if a fibre felt of significant width is required, to reciprocate the nozzle axially at right angles to the direction of motion of the permeable surface. Provided the speed of this reciprocating motion is substantially less than the speed of motion of the permeable surface an effectively parallel alignment will still result. Alternatively, by appropriately selecting the rate or direction of movement of the aligning nozzle an array of aligned fibres may be deposited upon the permeable surface at a predetermined angle to either the permeable surface or a preceding deposited array of aligned fibres, a variety of 'angle-ply' felts can be formed. Each array of fibres in such a cross-ply felt is substantially unidirectional and the felt has a packing efficiency not greatly less than a wholly unidirectionally oriented felt, combined with greater strength in directions away from the mean direction of fibre alignment.

In accordance with a further optional feature of the invention, the relative velocity between the nozzle and the permeable surface may be maintained at a desired constant value even though the angular velocity of the permeable surface is steadily increased with increasing felt thickness, by applying an appropriate angular velocity to the nozzle.

In accordance with another optional feature of the invention, the permeable surface may be profiled to a desired configuration so that aligned fibres may be deposited upon it to form a shaped felt having a predetermined three-dimensional form. Similarly, the permeable surface may be masked or othewise shielded in selected areas to give a felt having spaces, or reduced weights of fibre, in the selected areas.

The processes of the present invention may be applied to any fibrous material which can be aligned as a dispersion in a liquid dispersion medium, but are applied with particular advantage to the high strength brittle ceramic reinforcing fibres silicon carbide, silicone nitride, chopped carbon fibres and asbestos. Processes forming non-interfering dispersions of these materials suitable for alignment are well known and have been described for example in British Pats. Nos. 1,128,321 and 1,220,215. Suitable dispersion media are generally, but not necessarily, relatively viscous liquids having a viscosity of at least 1 poise. The range of viscosities may, however, vary depending on the fibres to be processed. Thus with carbon fibres viscosities as low as 10 centipoise may be used although higher viscosities are more normal. Suitable media include aqueous solutions of dispersing agents, aqueous alginates, aqueous and non-aqueous solutions of synthetic resins, glycerine. However it may be possible to use less viscous media if very high centrifugal accelerations are employed.

Figure 2:
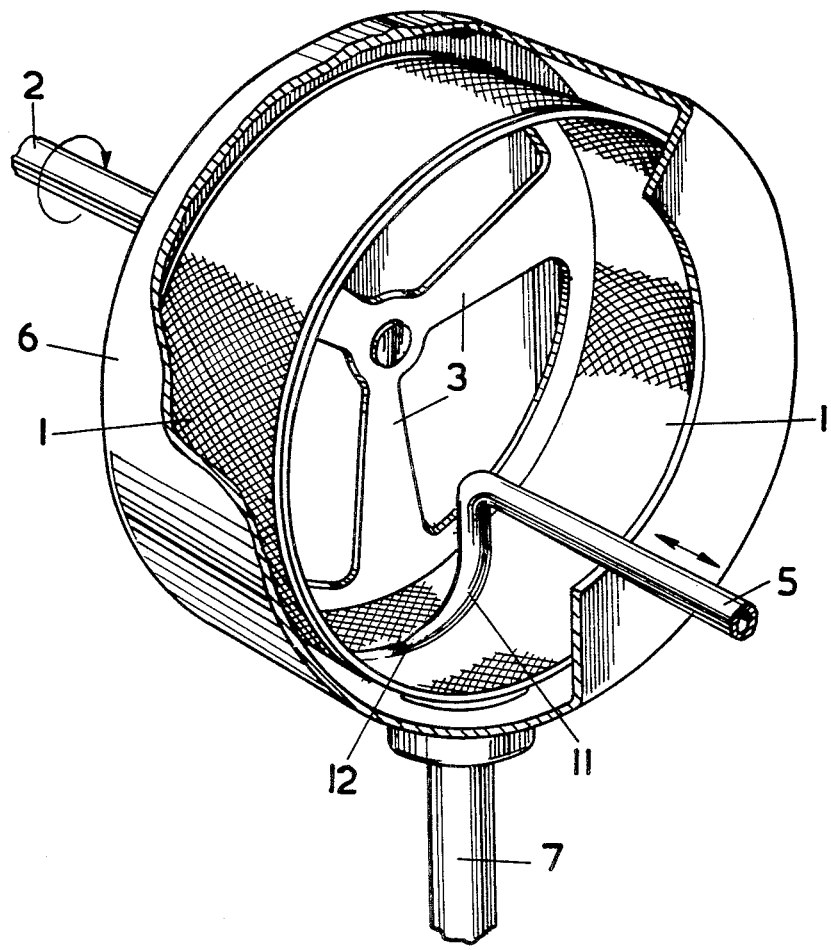
Figure 3:
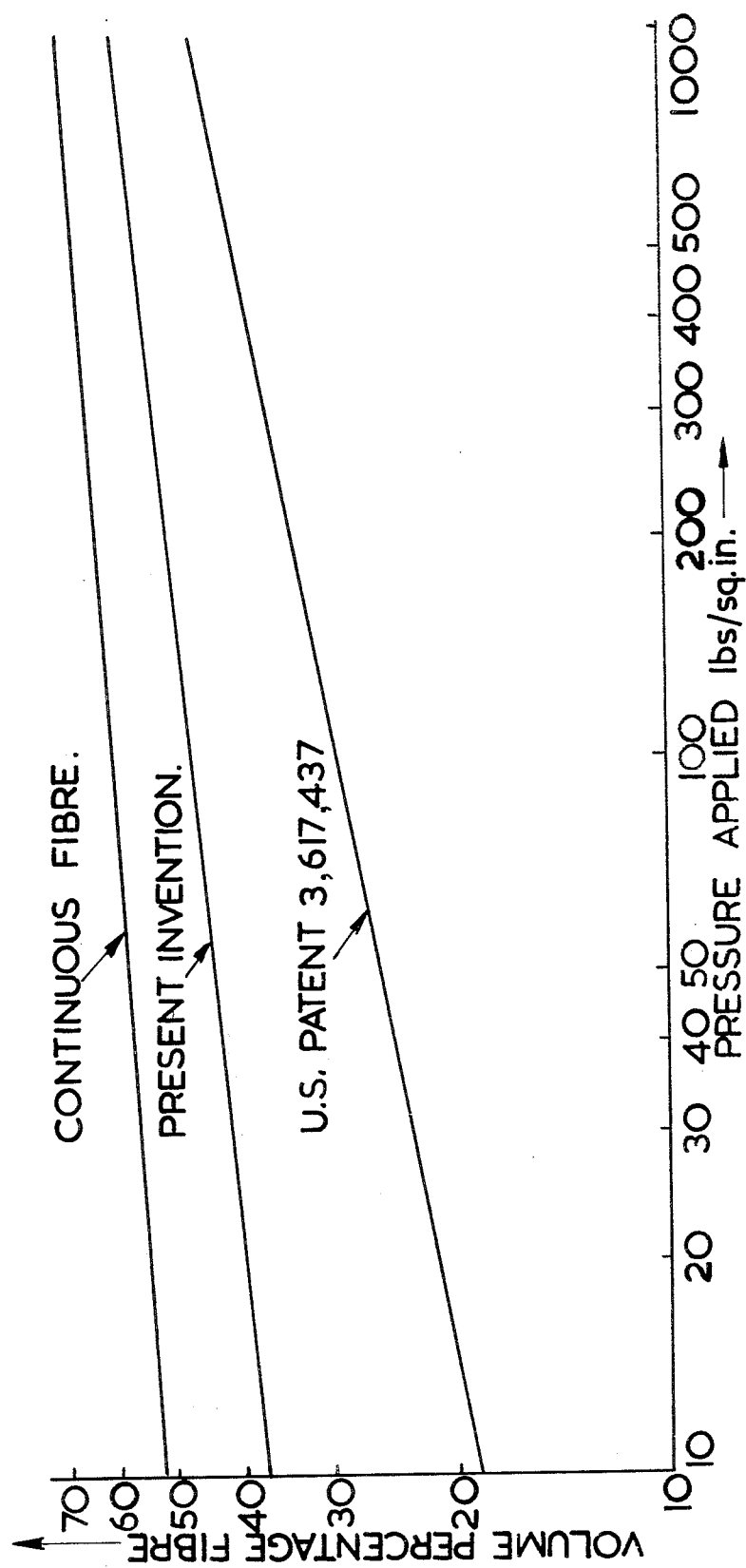
Figure 4:
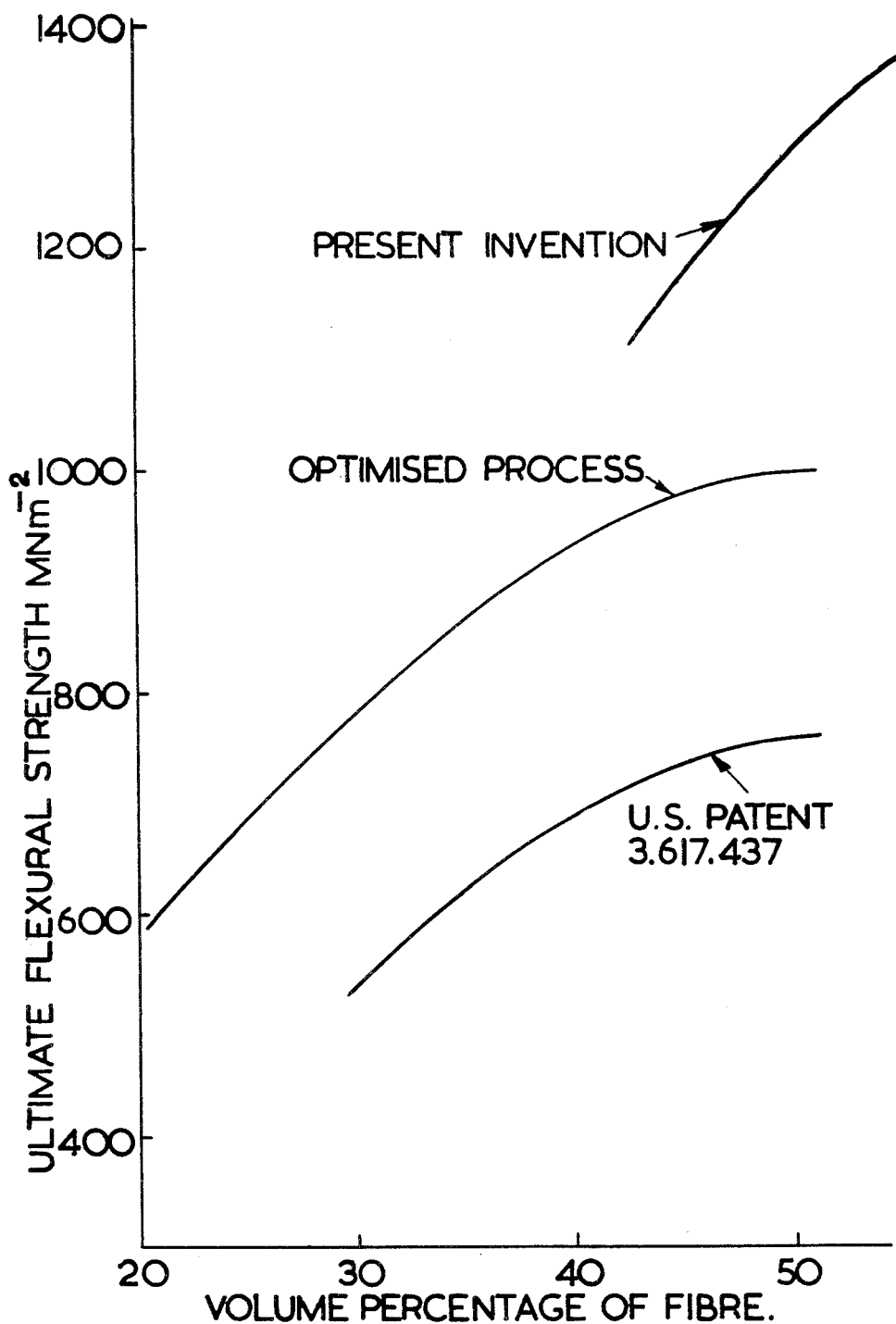

A typical example of the production of composite material by a process in accordance with the invention will now be described with reference to the accompanying drawings in which:

FIGS. 1 and 2 show two different forms of apparatus for producing aligned fibre felts by the process of the invention and FIGS. 3 and 4 show in graphical form properties of the products produced as compared with the products of processes known hitherto.

EXAMPLE 1

Referring to FIG. 1 the apparatus comprises a permeable surface in the form of a hollow cylinder 1 of wire mesh mounted for rotation about its longitudinal axis upon a horizontal driving shaft 2 by way of radial supporting members 3. A slit shaped aligning nozzle 4 of the type described in U.S. Pat. No. 3,617,437 is disposed above a lower part of the cylindrical permeable surface with the slit exit of the nozzle extending axially across the width of the cylinder. The nozzle is supplied with fibre dispersion through inlet pipe 5. The apparatus is conveniently provided with a fixed housing 6 outside the cylindrical permeable surface to collect liquid dispersion medium passing through the surface and the collected medium is led away through an outlet 7.

In a typical operation a dispersion of 0.25% by weight of chopped carbon fibre (having a length of 0.3 cm and aspect ratios of 300:1) in glycerine having a viscosity of 4 poise is pumped to the aligning nozzle at a pressure of 30 lb/sq inch (206 $\times 10^3$ NM$^{-2}$) and emerges from the nozzle with a velocity of about 10 feet/second (3 ms$^{-1}$) on to a cylindrical permeable surface of diameter about 16 inches (42 cm) and width about 6 inches (17 cm) rotating at about 900 revolutions per minute. ¼lb/sq ft/hour (1226 gm$^{-2}$ h$^{-1}$) fibres were supplied to give a layer of carbon fibre felt aligned in the direction of rotation of the permeable surface to a thickness of 0.5 cm. The felt was sufficiently strong to be handled and removed from the permeable surface as a loop corresponding to the dimensions of the permeable surface. The loop was cut to give a strip of aligned fibre felt which was impregnated with an epoxy resin and moulded at 200 pounds/square inch(1.5 MN m$^{-2}$) to give a composite material having a carbon fibre content of 50 % by volume in which the fibres appeared on microscopic examination to be all aligned without 10° of the chosen alignment direction.

EXAMPLE 2

FIG. 2 shows a modified form of the apparatus of FIG. 1 having the same permeable surface 1, shaft 2, supply pipe 5 and casing 6. However the slit shaped nozzle 4 is replaced by a tapered nozzle 11 extending circumferentially along the permeable surface. The tapered nozzle ends with a circular orifice 12 close to the permeable surface and makes an angle of about 30° with the tangent to said surface at the point adjacent the orfice. The permeable surface 1 is lined with a 100 mesh nylon gauze liner (not shown) on its inner surface to facilitate removal and handling of the finished felt.

In a typical apparatus the diameter of the pipe was 14 mm and this was tapered to an orifice of about 0.7 mm diameter. Using the same cylindrical surface as in example 1 rotating at 850r/min (G-factor 170) a 0.16 per cent by weight suspension of 3 mm long chopped carbon fibre in glycerol solution of viscosity 10 poise was supplied to the nozzle at a pressure of $206 \times 10^3$ NM$^{-2}$. The exit velocity from the orifice was 4.55 ms$^{-1}$ giving a ratio of peripheral permeable surface speed to dispersion outlet speed of about 4:1. The nozzle was reciprocated across the centre 8 cm of the permeable surface at about 13.5 ms$^{-1}$ so that the nozzle traversed one orifice diameter for each revolution of the permeable surface. The deposition rate was 260 grm m$^{-2}$ h$^{-1}$. After a felt of thickness 1 mm had been built up it was removed from the apparatus and heated in a muffle furnace to remove glycerol.

Felts prepared in this manner from 3 mm length high strength (Type 2) carbon fibre (Courtaulds Graphil HT-S) were compared with those prepared from similar fibres by the process of U.S. Pat. No. 3,617,437 and from continuous carbon fibre.

FIG. 3 shows the relationship of volume percentage fibre in the felt to applied pressure.

FIG. 4 shows the relationship of ultimate flexural strength to volume percentage of fibre for composites with an epoxy resin (Shell DX 210 - BF$_3$ 400) from felts produced by the present process, the process as described in U.S. Pat. No. 3,617,437 and the latter process as further optimised by the present inventors.

It can be seen that felts produced by the process of the present invention show higher packing density at a given pressure and higher flexural strength at given fibre loadings that those produced by the process of U.S. Pat. No. 3,617,437. Thus felts produced by the present process may be presumed to possess a degree of alignment more closely approaching that which can be achieved with continuous fibre.

EXAMPLE 3

Using the apparatus described in example 2 and a dispersion flow rate of 1.6 cc/sec (speed =4.1 ms$^{-1}$) the effect of varying the angular velocity of the permeable surface was investigated. The conditions used and the ultimate tensile strength (UTS) of the resulting epoxide composite are shown in Table 1 together with a result obtained at the same flow rate with a 4 inch diameter permeable surface

TABLE I

| Approximate Velocity rpm | G-Factor | Vel Ratio Surface:Dispersion | Viscosity of Carrier Poise | UTS (MN m$^{-2}$) of Composite |
|---|---|---|---|---|
| 810* | 37 | 1:1 | 4 | 1013 |
| 490 | 57 | 1:2.6 | 10 | 1272 |
| 730 | 120 | 1:3.9 | 10 | 1334 |
| 860 | 160 | 1:4.6 | 6 | 1298 |
| 970 | 205 | 1:5.2 | 10 | 1250 |
| 1010 | 235 | 1:5.4 | 10 | 1240 |
| 1210 | 340 | 1:6.5 | 10 | 1045 |

*4 inch diameter permeable surface

From these figures it can be seen that at high angular velocities the alignment deteriorates. The precise level at which this occurs, however, is probably also related to the peripheral velocity and hence the diameter of the permeable surface.

EXAMPLE 4

The process of example 2 was repeated, but deposition was continued beyond 1 mm felt thickness with progressive increase of the rate of rotation up to 1100 revolutions per minute (G-factor 280, peripheral speed 24.2 ms$^{-1}$). A felt of thickness 4 mm and having good alignment was produced.

We claim:

1. A process for the manufacture of composite materials comprising a matrix containing aligned reinforcing fibres including the steps of dispersing the fibres in a liquid dispersion medium, passing the dispersion through a slit shaped aligning nozzle or a tapered nozzle so that the fibres are at least partially aligned and depositing the dispersion containing the aligned fibres upon a permeable surface capable of retaining substantially all the fibres and moving relative to the nozzle at a speed greater than the speed with which the fibres are travelling immediately before deposition and with an angular velocity sufficient to pass the dispersion medium rapidly through the permeable surface by centrifugal acceleration to leave a substantially dry fibre felt and thereby maintaining the alignment of the aligned fibres on the permeable surface such that at least 50% of the fibres are within 10° of the desired alignment direction.

2. A process according to claim 1 wherein the permeable surface is in the form of an endless belt.

3. A process according to claim 2 wherein the endless belt is a cylinder rotating about a generally horizontal axis.

4. A process according to claim 1 wherein the permeable surface is composed of a screen of wire mesh or perforated metal sheet with apertures small enough to retain the fibres and large enough to permit rapid passage of the dispersion medium.

5. A process according to claim 1 wherein the centrifugal acceleration produces a force at least 150 times the gravitational force.

6. A process according to claim 1 wherein the angular velocity of the permeable surface is increased as the thickness of the aligned fibres retained by the permeable membrane increases.

7. A process according to claim 1 wherein the aligning nozzle ends in a circular orifice.

8. A process according to claim 1 wherein the aligning nozzle is moved relative to the path of the permeable surface.

9. A process according to claim 1 wherein ratio of the relative speed between the nozzle and the permeable surface to the speed of the dispersion leaving the nozzle is at least 2:1.

10. A process according to claim 1 wherein the permeable surface is profiled to a desired configuration so that aligned fibres may be deposited on it to form a shaped felt having a predetermined three-dimensional form.

11. A process according to claim 1 wherein the permeable surface is masked or shielded to render it impermeable in selected areas, thereby preventing deposition of fibers in said areas.

12. A process according to claim 1 wherein the reinforcing fibres are carbon fibres.

13. A process according to claim 12 wherein the final alignment of the reinforcing fibres on the permeable surface is such that at least 90% of the fibres are within 10° of the desired alignment direction.

14. A process according to claim 1 wherein the aligned reinforcing fibres are selected from the group consisting of silicon carbide whiskers, silicon nitride whiskers and asbestos fibres.

15. A process according to claim 1 wherein the liquid dispersing medium has a viscosity of at least 1 poise.

*

REEXAMINATION CERTIFICATE (203rd)
United States Patent [19]
Bagg et al.

[11] B1 4,016,031
[45] Certificate Issued  Jun. 5, 1984

[54] MANUFACTURE OF COMPOSITE MATERIALS

[75] Inventors: Greville E. G. Bagg, Waltham Abbey; John Cook, Cheshunt; Leslie E. Dingle, London; Henry Edwards, Harlow; Hans Ziebland, Hertford, all of England

[73] Assignee: National Research Development Corporation, London, England

Reexamination Request:
No. 90/000,128, Dec. 21, 1981

Reexamination Certificate for:
Patent No.: 4,016,031
Issued: Apr. 5, 1977
Appl. No.: 538,708
Filed: Jan. 6, 1975

Related U.S. Application Data

[63] Continuation-in-part of Ser. No. 283,665, Aug. 25, 1972, abandoned.

[30] Foreign Application Priority Data
Sep. 1, 1971 [GB] United Kingdom ............... 40699/71

[51] Int. Cl.$^3$ ............................................. D21F 11/06
[52] U.S. Cl. .................................... 162/213; 162/218; 162/384; 264/311; 425/85
[58] Field of Search ............... 162/213, 384, 218, 102, 162/116; 425/85, 86; 264/311; 162/152

[56] References Cited

U.S. PATENT DOCUMENTS

| | | | |
|---|---|---|---|
| 1,819,771 | 8/1931 | Darrah | 162/384 |
| 3,210,241 | 10/1965 | Grauss et al. | 162/384 |
| 3,549,742 | 12/1970 | Benz | 162/348 |
| 3,617,443 | 11/1971 | Chleg et al. | 162/384 |

FOREIGN PATENT DOCUMENTS

1128321  9/1968  United Kingdom .
1220213  1/1971  United Kingdom .

*Primary Examiner*—William F. Smith

[57] ABSTRACT

Mats of aligned fibers are formed by feeding a dispersion of fibers through an aligning nozzle onto the inner surface of a cylindrical permeable surface and rotating the surface sufficiently rapidly to remove the dispersion medium and maintain the fiber alignment on the surface.

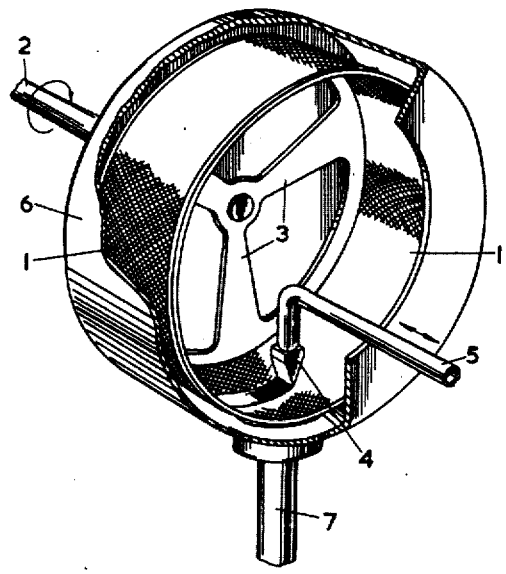

REEXAMINATION CERTIFICATE ISSUED UNDER 35 U.S.C. 307.

THE PATENT IS HEREBY AMENDED AS INDICATED BELOW.

AS A RESULT OF REEXAMINATION, IT HAS BEEN DETERMINED THAT:

Claims 1-15, having been finally determined to be unpatentable, are cancelled.

* * * * *